(No Model.)

L. PUSEY.
ICE MAKING APPARATUS.

No. 491,225. Patented Feb. 7, 1893.

Witnesses:
John R. Nolan
James C. Dugan

Inventor:
Joshua Pusey

UNITED STATES PATENT OFFICE.

LEA PUSEY, OF WILMINGTON, DELAWARE.

ICE-MAKING APPARATUS.

SPECIFICATION forming part of Letters Patent No. 491,225, dated February 7, 1893.

Application filed December 21, 1891. Serial No. 415,707. (No model.)

*To all whom it may concern:*

Be it known that I, LEA PUSEY, a citizen of the United States, residing at Wilmington, in the county of New Castle and State of Delaware, have invented certain new and useful Improvements in Ice-Making Apparatus, of which the following is a full, clear, and exact description, reference being had to the accompanying drawings, of which—

Figure 1:
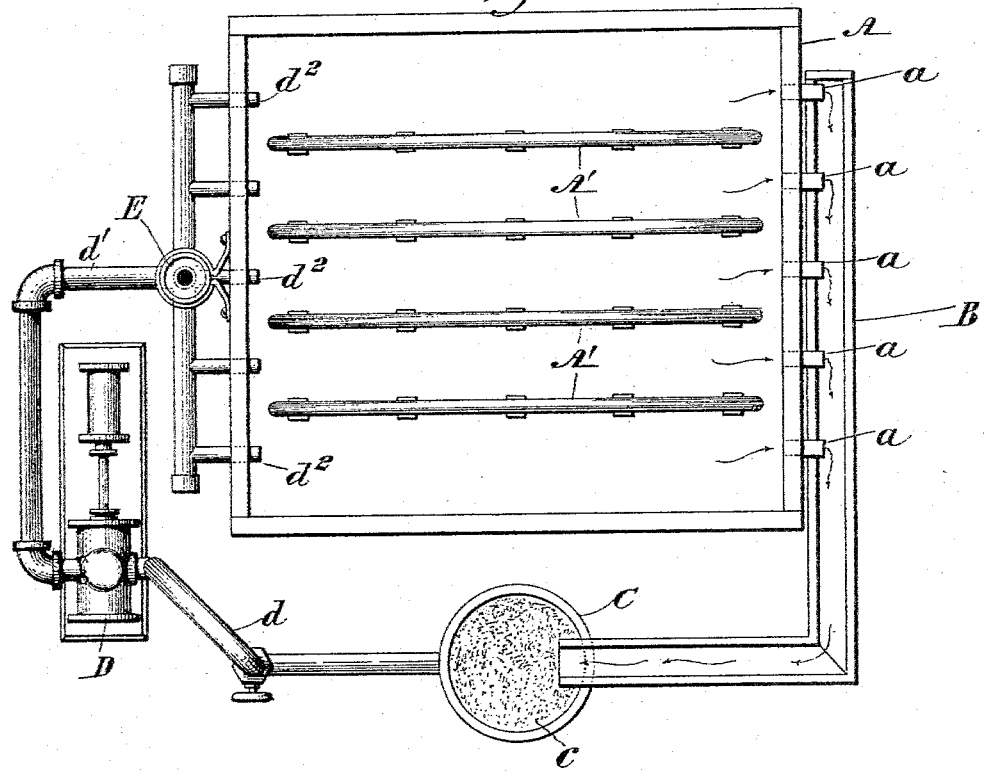
Figure 2:
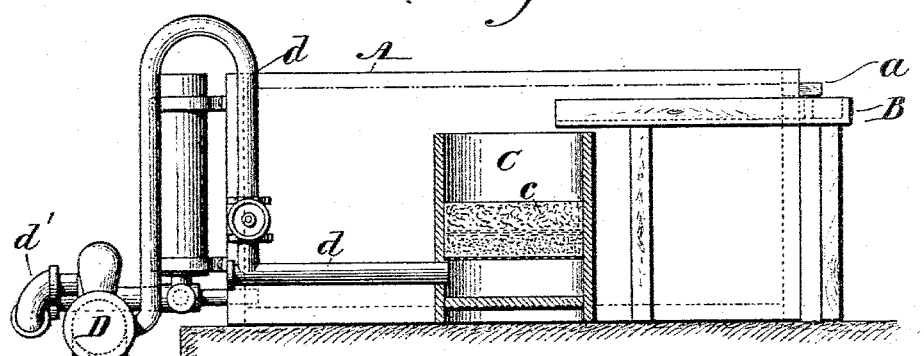

Figure 1 is a plan view of an ice-making apparatus embodying my invention. Fig. 2 is a sectional elevation thereof.

This invention relates to the manufacture of ice artificially by what is known as the ammonia, and similar processes.

Its object is to de-aerate and purify the water to be frozen, and during the freezing operation, in order to produce a perfectly clear and solid ice, practically free from air bubbles and purged of impurities. I accomplish this result by filtering the water and maintaining it at a uniform level, but in circulation, by means of a certain construction, combination and arrangement of devices which constitute the apparatus, and which co-operate to produce the final result, as I shall now proceed to describe.

Referring to the annexed drawings, A designates the usual freezing tank which contains the congealing pipe system A', through which the ammonia or other congealing agent is passed in the manner well known. I provide on the side of the tank, near the top, a series of over-flow pipes, $a$, which empty into an adjacent trough or conduit B, on the outside. The water which is caused to flow into the tank cannot rise above the level of the pipes $a$, and hence the overflow runs into the common trough B, which latter empties into a reservoir C, which I term the filtering tank, as it preferably contains a suitable material, $c$, for filtration of the water, which is caused to percolate through the material.

D is a pump which communicates with the filtering tank by means of a siphon pipe $d$, having its bend higher than the water level of vessel C while the free end of the discharge pipe $d'$, or preferably a series of pipes $d^2$ connecting with pipe $d$, opens into the lower part of the freezing tank A.

E is a stand-pipe, open at the top, and communicating at its lower end with the pump discharge pipe $d'$. The filtering material in the vessel C may be dispensed with, when it is not necessary to purify the water. Also, it is not essential that the siphon, or equivalent means for maintaining the partial or retarded vacuum, shall be located at the particular point shown in the drawings, but it is requisite that it shall be within, or connected with, the pipe or conduit, which carries the overflowed water to the pump.

Having thus described the construction of the apparatus, the mode of operation is briefly as follows: The tank A is filled with the water to be frozen, and the over-flow passes into the trough B, thence into the filtering tank until the latter is full. The pump is then put in operation, whereupon the water which has percolated through the filtering substance is drawn from the tank by way of siphon pipe $d$, and then is forced into the freezing tank through the discharge pipe $d'$ and its branches $d^2$. The freezing action of the ammonia coursing through pipes A', proceeds, and the water is kept in circulation, and filtration, as the upper portion in the tank continually overflows into the filtering tank. The suction of the pump frees the water from excess of air, which escapes by way of the stand-pipe E, and the filter removes the impurities. The uniform flow and reflux of the water insures the regular action of the freezing agent. The result is that a more perfect artificial ice is produced than by any method or apparatus with which I am acquainted.

I have discovered that a partial, or what may be termed a retarded, vacuum in the pipe $d$ between the pump and the tank C, in some way, causes the air globules to get together or separate from the water in said pipe. The function of the siphon (which, however, may be dispensed with, at a disadvantage) is to secure and maintain such partial vacuum, as it will be obvious that at the bend of the siphon there will be comparatively little pressure. A like result may be attained by means of a valve, or contracted orifice in pipe $d$, in lieu of the siphon. A partial vacuum equal to about ten inches of mercury appears to be the most effective. I remark that it is probable that the minute orifices through the filtering material also aid in the securing of such partial vacuum.

The stand-pipe may be dispensed with, but it is not desirable so to do, as without it the air cannot escape with readiness, and besides, it would to a certain extent prevent the regular flow of the water.

I remark that it is advisable to protect the pump and the several pipes with a substance that is a good non-conductor of heat, in order to prevent the escape of the caloric as the water passes through.

I am aware of the fact that an ice-making apparatus has been described, wherein is shown a closed, or air-tight, refrigerating vessel, with pipes entering the top and bottom thereof, respectively, in connection with a filter and pump, whereby the water is described as being kept in a state of circulation and filtration during the freezing process; but the refrigerating vessel, being air-tight, there is no opportunity for the air to escape; consequently, it is carried around in circulation with the water. Obviously, in such a construction the air cannot efficiently separate from the water, as it does in my construction; wherein the air may readily find an exit by the stand pipe, or by way of the open freezing tank if the stand pipe is dispensed with, which latter, however, is not recommended to be done, for the reason that the air escaping through the water in the said tank agitates the water, and thus, to a certain extent, interferes with the uniform congelation and circulation of the water.

Having thus described my invention, I claim as new and wish to secure by Letters Patent—

1. In an ice-making apparatus, the combination of the freezing tank, the filtering tank, the over-flow pipe or pipes, communicating between said tanks, the suction and force pump, and the influx and efflux pipes, the one communicating with said filtering tank, the other with the freezing tank, the recited elements being relatively arranged, substantially as shown, whereby the water may flow by gravity from the freezing tank to the filtering tank and be thereby maintained in its circulation, and at a uniform level, in said freezing tank, substantially as described.

2. In an ice-making apparatus, the combination of the open freezing tank, the filtering tank, the over-flow pipe or pipes, communicating between said tanks, the suction and force pump, and the influx and efflux pipes, the one communicating with said filtering tank, the other with the freezing tank, together with means for maintaining a partial or retarded vacuum in the pipe between the tank C and the pump substantially as described.

3. In an ice-making apparatus, the combination of the freezing tank, the filter tank, the over-flow pipe or pipes communicating between said tanks, the suction and force pump, and the influx and efflux pipes, the one communicating with said filtering tank, the other with the freezing tank, together with the stand-pipe, substantially as described.

4. In an ice-making apparatus, the combination of the freezing tank, the filtering tank, the over-flow pipe or pipes, communicating between said tanks, the suction and force pump, and the influx and efflux pipes, the one communicating with said filtering tank, the other with the freezing tank, together with the siphon and the stand-pipe, substantially as described.

In testimony whereof I have hereunto affixed my signature this 1st day of October, A. D. 1891.

LEA PUSEY.

Witnesses:
JOSHUA PUSEY,
JOHN R. NOLAN.